June 26, 1962 P. S. MacGREGOR 3,040,778
VALVES FOR CONTROLLING THE FLOW OF FLUIDS
Filed Sept. 1, 1959 2 Sheets-Sheet 1
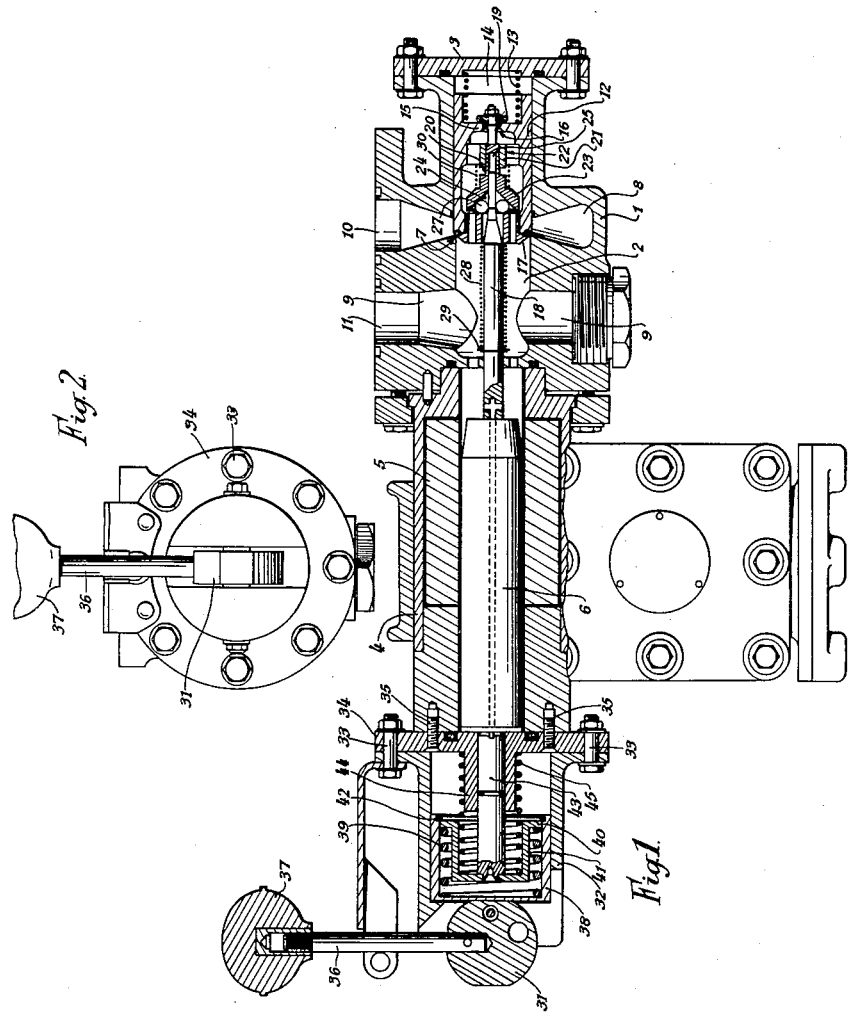
INVENTOR
PETER STEVENS MACGREGOR
BY
Dean, Fairbank & Hirsch
ATTORNEYS.

June 26, 1962 P. S. MacGREGOR 3,040,778
VALVES FOR CONTROLLING THE FLOW OF FLUIDS
Filed Sept. 1, 1959 2 Sheets-Sheet 2

INVENTOR
PETER STEVENS MACGREGOR
BY
Dean, Fairbank & Hirsch
ATTORNEYS

United States Patent Office 3,040,778
Patented June 26, 1962

3,040,778
VALVES FOR CONTROLLING THE FLOW
OF FLUIDS
Peter Stevens MacGregor, Upton Poole, England, assignor to Flight Refuelling Limited, near Blandford, England
Filed Sept. 1, 1959, Ser. No. 837,511
1 Claim. (Cl. 137—630.15)

This invention relates to valves for controlling the flow of fluids, of the kind in which a closure member co-operating with a seat interposed between the valve inlet and outlet is urged towards its seat by fluid pressure acting in a control chamber having a constant restricted communication with the inlet and capable of being connected to the outlet by the opening of an auxiliary valve closure member also urged towards its seat by the pressure in the control chamber, the arrangement being such that the fluid pressure in the control chamber, when that pressure is equal to the pressure in the valve inlet, with or without the assistance of a spring, is able to hold the main valve closure member on its seat.

The object of the invention is to provide a valve capable of being opened agianst a substantial pressure by a relatively small force.

In a valve according to the invention the motion of an operating member is transmitted to the auxiliary valve closure member through roller means providing a mechanical advantage.

The roller means may comprise balls moved radially outwardly by the movement between them of a frusto-conical surface on the operating member, the said balls being interposed between a flat annular abutment surface and a frusto-conical surface moving with the auxiliary valve closure member.

Movement of the operating member may be effected by a solenoid, manually, or by other convenient means.

In order that the invention may clearly be understood and carried into effect the same will now be described by aid of the accompanying drawings in which:

FIGURE 1 is a longitudinal section through a valve according to one embodiment;

FIGURE 2 is an end view of the valve of FIGURE 1; and

Figure 3:
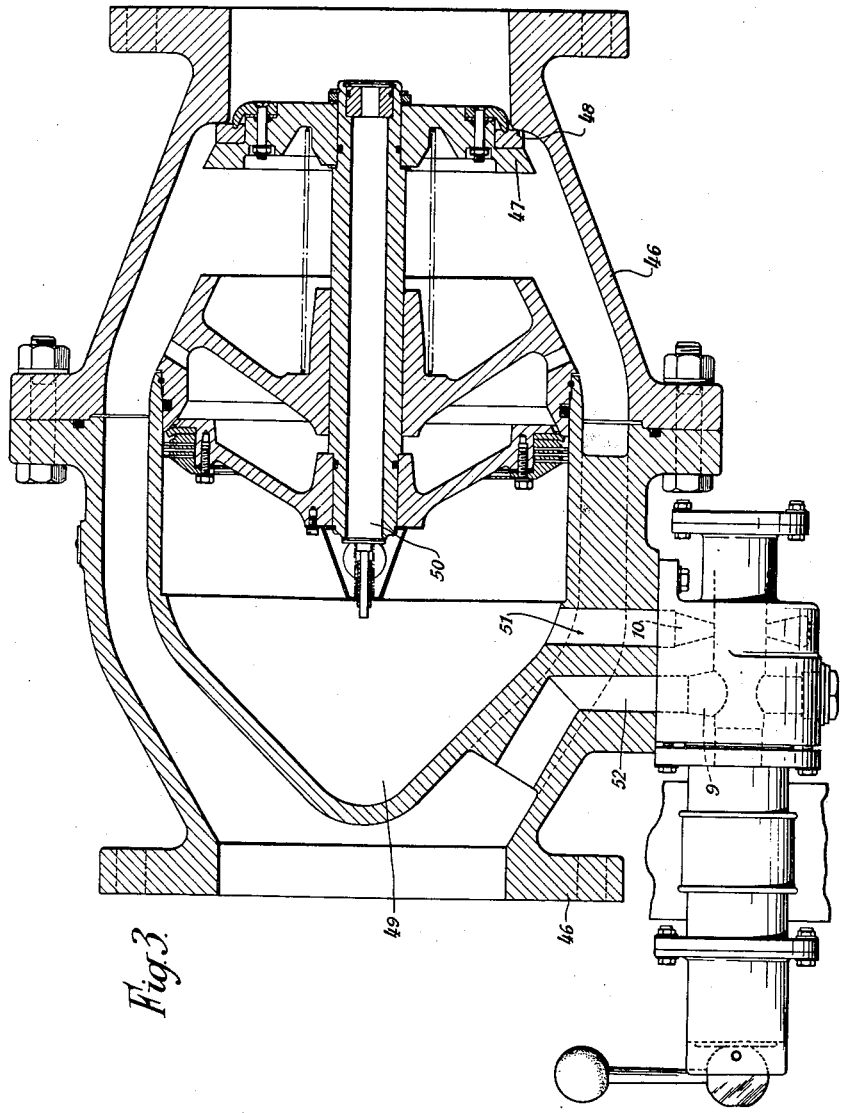
FIGURE 3 is a longitudinal section of a main shut-off valve incorporating the valve of FIGURES 1 and 2 as a pilot valve.

Referring to FIGURES 1 and 2 of the drawings the valve has a valve body 1 provided with a longitudinal bore 2 closed at one end by a removable closure plate 3 and adapted at its other end for the attachment thereto of a casing 4 containing a solenoid the coil 5 and the armature 6 of which are co-axial with the valve bore. The valve bore 2 is stepped to provide intermediate its ends, a shoulder 7 the portion of the bore 2 remote from the solenoid being of larger diameter than the portion adjacent the solenoid. An annular groove 8 surrounds the larger portion of the bore close to the shoulder 7, and a transverse passage 9 opens into the smaller portion of the bore, the annular groove 8 being connected to an inlet 10 and the transverse passage 9 to an outlet 11. A valve plunger 12 slidable in the larger portion of the bore 2 is adapted to engage with the shoulder 7, which thus constitutes a valve seat, and thereby to close off communication between the inlet and outlet, the valve plunger 12 being urged towards its seat by a coiled compression spring 13 mounted in a space hereinafter called the control chamber 14 between the said valve plunger and the removable closure plate 3. The valve plunger 12 is not a fluid-tight fit in the larger portion of the valve bore 2, so that fluid from the inlet 10 can reach the control chamber 14 and assist to hold the valve plunger 12 on its seat.

The valve plunger 12 is hollow, the interior thereof being divided by a transverse partition wall 15 in which is formed an opening 16, and the end of the said plunger adjacent the valve seat has fitted therein a bush 17 through which passes a thrust rod 18 fixed to the armature 6 of the solenoid. The other end of the valve plunger 12 is open to the control chamber, and a disc valve 19 mounted therein has a stem 20 which passes through the opening 16 in the partition wall 15 and through a central guide 21 in a spider 22 inside the valve plunger, the stem 20 having, on its end adjacent the bush 17, an enlarged head 23 formed with an internal frusto-conical surface 24 facing the said bush 17. The thrust rod 18 extends into a bore 25 in the stem 20, and has a frusto-conical surface 26 tapering towards the end which extends into the said bore, a ring of balls 27 being arranged around the thrust rod between the frusto-conical surface 24 in the enlarged head 23 and the adjacent end of the bush 17.

A coiled compression spring 28, disposed between the end of the bush 17 and an abutment ring 29 on the thrust rod urges the latter outwardly of the valve plunger 12. Another coiled compression spring 30, acting between the enlarged head 23 on the stem 20 of the disc valve and the spider 22 tends to seat the disc valve 19 around the opening in the partition wall 15, thus preventing the escape of fluid from the control chamber 14.

Assuming that the inlet 10 of the valve is connected to a source of fluid pressure, and the solenoid is not energised, the control chamber 14 contains fluid at the pressure obtaining in the inlet, and the valve plunger 12 is firmly seated to prevent the passage of fluid to the outlet 11 the disc valve 19 also being held seated by its closing spring 30 and by the pressure in the control chamber 14. The thrust rod 18, under the influence of the spring 28 acting thereon, is urged outwardly to bring a portion thereof at the smaller end of the frusto-conical portion 26 into the plane of the centres of the balls 27, allowing the latter to take up positions on a circle of minimum radius.

When the solenoid is energised, the thrust rod 18 is moved inwardly of the valve body 1, the frusto-conical portion 26 thereof being urged between the balls 27 to force them radially outwardly. The balls thus exert a wedging force between the end of the bush 17 and the frusto-conical surface 24 on the head 23, and move the disc valve 19 off its seat. The pressure in the control chamber 14 is thus relieved and, after a predetermined movement of the thrust rod 18, the end thereof engages the end of the bore 25 in the disc valve stem 20, and the pilot valve is further opened until a shoulder on the enlarged head 23 engages the spider 22 in the valve plunger and the latter is itself unseated. It will be apparent that, once the disc valve 19 is unseated, the pressures acting on both ends of the valve plunger 12 are the same, and only the spring 13 in the control chamber 14 has to be overcome to unseat the said plunger.

When the solenoid is de-energised, the return springs 13, 20 and 28 restore the parts to their initial positions, and pressure is again built up in the control chamber 14.

Manual operation of the valve may be effected by means of a cam acting on the armature of the solenoid, conveniently through a resilient thrust member which yields if the valve is opened fully before the cam has reached the end of its opening movement.

In the construction shown in FIGURES 1 and 2 manual operation of the valve is effected by rotation of a cam 31 mounted on a housing 32 secured by a ring of bolts 33 to a flange plate 34 which is in turn secured by screws 35 to the outer end of the solenoid casing 4. Movement of the cam is effected through a hand lever 36 connected by one end to the cam the free end of the lever being provided with a hand knob 37.

The cam surface of cam 31 bears on the closed end of a sleeve 38 slidably mounted in the interior of the housing 32, a compression spring 39 being located within the interior of the sleeve. One end of the spring 39 abuts the closed end of the sleeve whilst the other end abuts the flange 40 of a cap 41 also located within the interior of the sleeve 38 and held therein by a spring retaining ring 42. The cap 41 is secured to one end of a plunger 43 the opposite end of which opposes the end of the solenoid armature 6 the plunger 43 being slidably mounted in the bore of a spigot 44 carried by the flange plate 34, the plunger being urged in the condition of rest away from the armature 6 by a return compression spring 45.

Upon movement of the hand lever 36 to effect manual operation of the valve the cam is rotated so that the sleeve 38 is moved inwardly, the movement being transmitted through spring 39 and cap 41 to the plunger 43. A corresponding sliding movement is therefore imparted to the armature 6 of the solenoid with the result that the valve is operated. To ensure full travel of the valve plunger 12 when operated manually the cam is constructed to provide a slightly longer stroke than is required to open the valve, the spring 39 being compressed to permit displacement of the sleeve 38 relative to plunger 43 at the limit of the stroke of the valve plunger 12.

The valve according to the invention is particularly useful as a pilot valve for controlling the operation of a main valve of larger capacity. For example as shown in FIGURE 3 the valve described is connection with FIGURES 1 and 2 is used in combination with a main shut-off valve 46 in which the valve closure member 47, like that of the pilot valve, is held on its seat 48 by fluid pressure built up in a control chamber 49 connected through a restricted passage 50 to the upstream side of the said main valve, the pilot valve being employed to control the escape of fluid from the control chamber 49 of the main valve to the downstream side of the latter for which purpose the inlet opening 10 of the pilot valve is connected by an outlet passage 51 in the body of the shut-off valve 46 to the control chamber 49, the outlet 9 being connected by an inlet passage 52 also in the body of shut-off valve 46 to the downstream side of the valve.

I claim:

A valve comprising a casing having a bore, an annular seat in said bore, a pair of passageways leading into said bore on each side of said annular seat, a valve plunger slidably mounted in said bore and having a main valve head at one end adapted to engage said seat to cut off communication between said passageways, resilient means in said bore reacting against the other end of said plunger normally to retain the head thereof against said seat, the portion of said bore in which said resilient means is positioned defining a chamber in communication with one of said passageways, said plunger having a bore therethrough of reduced diameter between its ends defining a seat on the side thereof in communication with said chamber, an auxiliary valve head having a hollow stem extending through said plunger bore, said plunger having an abutment, said stem having an abutment near its outer end and an enlarged hollow head at its inner end having a frusto-conical inner surface, resilient means urging said stem inwardly to retain said auxiliary valve head in sealing engagement on the seat defined by the reduced diameter portion of the casing bore, a thrust rod extending into the hollow stem and having a frusto-conical surface associated with and normally spaced from the frusto-conical surface of said hollow head, resilient means normally retaining said frusto-conical thrust rod surface spaced from the frusto-conical surface of said hollow head and the abutment of said stem spaced from the abutment of said plunger, a ring of balls encompassing said stem between said frusto-conical portions, whereby when said thrust rod is first moved the frusto-conical portion thereof will move the balls outwardly to react against the frusto-conical surface of the hollow head to effect movement of the stem to move the auxiliary valve head off its seat and further movement of the thrust rod will effect engagement of the abutment of the stem with the abutment of the plunger to effect movement of the latter to move the main valve head off its seat.

References Cited in the file of this patent

UNITED STATES PATENTS

| | | |
|---|---|---|
| 2,020,833 | Hansen | Nov. 12, 1935 |
| 2,445,163 | Williamson | July 13, 1948 |
| 2,686,536 | Campbell | Aug. 17, 1954 |
| 2,719,021 | Seefluth | Sept. 27, 1955 |
| 2,831,504 | Coffey | Apr. 22, 1958 |
| 2,919,714 | Mrazek | Jan. 5, 1960 |

FOREIGN PATENTS

| | | |
|---|---|---|
| 571,628 | Canada | Mar. 3, 1959 |
| 918,685 | France | Nov. 4, 1946 |